(12) United States Patent
Hu et al.

(10) Patent No.: US 11,841,579 B2
(45) Date of Patent: Dec. 12, 2023

(54) BACKLIGHT MODULE AND LIQUID CRYSTAL DISPLAY PANEL

(71) Applicants: CHONGQING HKC OPTOELECTRONICS TECHNOLOGY CO., LTD., Chongqing (CN); HKC CORPORATION LIMITED, Shenzhen (CN)

(72) Inventors: Xiaogang Hu, Chongqing (CN); Haoxuan Zheng, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 2 days.

(21) Appl. No.: 17/990,947

(22) Filed: Nov. 21, 2022

(65) Prior Publication Data
US 2023/0161192 A1 May 25, 2023

(30) Foreign Application Priority Data
Nov. 22, 2021 (CN) .......................... 202111391139.X

(51) Int. Cl.
G02F 1/13357 (2006.01)
G02F 1/1333 (2006.01)
G02F 1/1362 (2006.01)

(52) U.S. Cl.
CPC .. G02F 1/133603 (2013.01); G02F 1/133385 (2013.01); G02F 1/136209 (2013.01)

(58) Field of Classification Search
CPC ......... G02F 1/136209; G02F 1/133385; G02F 1/133603
See application file for complete search history.

(56) References Cited

U.S. PATENT DOCUMENTS

| | | | |
|---|---|---|---|
| 2009/0279020 A1* | 11/2009 | Tanabe | G02B 6/0068 362/613 |
| 2011/0006334 A1* | 1/2011 | Ishii | C09K 11/7739 257/E33.07 |

FOREIGN PATENT DOCUMENTS

| | | |
|---|---|---|
| CN | 104267538 A | 1/2015 |
| CN | 105676535 A | 6/2016 |

(Continued)

OTHER PUBLICATIONS

First Office Action issued in corresponding CN Application No. CN202111391139.X, dated Jun. 22, 2022, pp. 1-6, Beijing, China.

*Primary Examiner* — Michael H Caley
*Assistant Examiner* — Agnes Dobrowolski
(74) *Attorney, Agent, or Firm* — HAUPTMAN HAM, LLP

(57) ABSTRACT

A backlight module and a liquid crystal display panel are provided. The backlight module includes a substrate, multiple light emitting diodes, a quantum dot layer, a light-shielding layer, and a heat dissipation structure. The substrate has a first surface and a second surface opposite to the first surface. The multiple light emitting diodes are disposed on the first surface. The quantum dot layer is disposed on one side of the multiple light emitting diodes facing away from the substrate. The multiple light emitting diodes are each configured to emit lights of a first color. The lights of the first color are of the first color, a second color, or a third color after passing through the quantum dot layer. The light-shielding layer is disposed between each two adjacent light emitting diodes. The heat dissipation structure is disposed on the second surface.

18 Claims, 4 Drawing Sheets

(56) References Cited

FOREIGN PATENT DOCUMENTS

| | | | |
|---|---|---|---|
| CN | 107390428 | A | 11/2017 |
| CN | 107394030 | A | 11/2017 |
| KR | 101909541 | B1 | 10/2018 |
| WO | WO-2019019216 | A1 * | 1/2019 ....... G02F 1/133512 |

* cited by examiner

BACKLIGHT MODULE AND LIQUID CRYSTAL DISPLAY PANEL

CROSS-REFERENCE TO RELATED APPLICATIONS

This application claims priority under 35 U.S.C. § 119(a) to Chinese Patent Application No. 202111391139.X, filed Nov. 22, 2021, the entire disclosure of which is incorporated herein by reference.

TECHNICAL FIELD

The disclosure relates to the field of display, and more particularly, to a backlight module and a liquid crystal display panel.

BACKGROUND

Quantum Dot Mini Light Emitting Diodes (QD-mini LED) relate to a display technology that combines quantum dots with Mini Light Emitting Diodes (mini LED). Existing QD-mini LED is poor in heat dissipation.

SUMMARY

In a first aspect, the disclosure provides a backlight module. The backlight module includes a substrate, multiple light emitting diodes, a quantum dot layer, a light-shielding layer, and a heat dissipation structure. The substrate has a first surface and a second surface opposite to the first surface. The multiple light emitting diodes are disposed on the first surface. The quantum dot layer is disposed on one side of the multiple light emitting diodes facing away from the substrate. The multiple light emitting diodes are each configured to emit lights of a first color. The lights of the first color are of the first color, a second color, or a third color after passing through the quantum dot layer. A mixture of the first color, the second color, and the third color is white. The light-shielding layer is disposed between each two adjacent light emitting diodes. The heat dissipation structure is disposed on the second surface.

In a second aspect, the disclosure further provides a liquid crystal display panel. The liquid crystal display panel includes a liquid crystal module and a backlight module. The backlight module includes a substrate, multiple light emitting diodes, a quantum dot layer, a light-shielding layer, and a heat dissipation structure. The substrate has a first surface and a second surface opposite to the first surface. The multiple light emitting diodes are disposed on the first surface. The quantum dot layer is disposed on one side of the multiple light emitting diodes facing away from the substrate. The multiple light emitting diodes are each configured to emit lights of a first color. The lights of the first color are of the first color, a second color, or a third color after passing through the quantum dot layer. A mixture of the first color, the second color, and the third color is white. The light-shielding layer is disposed between each two adjacent light emitting diodes. The heat dissipation structure is disposed on the second surface. The liquid crystal module and the backlight module are stacked. The backlight module is configured to emit lights to the liquid crystal module.

BRIEF DESCRIPTION OF THE DRAWINGS

In order to more clearly illustrate technical solutions of implementations of the disclosure or the related art, the following will briefly introduce drawings required for description of implementations or the related art. Obviously, the drawings in the following description are only some implementations of the disclosure. For those of ordinary skill in the art, other drawings can also be obtained from these drawings without creative effort.

Description of reference numbers:

100-liquid crystal display panel;

10-backlight module, 11-substrate, 111-first surface, 112-second surface, 113-gap, 12-light emitting diode, 121-light emitting surface, 122-side surface, 123-mounting surface, 13-quantum dot layer, 131-first color conversion area, 132-second color conversion area, 133-third color conversion area, 134-connection area, 14-light-shielding layer, 141-first light-shielding layer, 142-second light-shielding layer, 15-heat dissipation structure, 151-thermal conductive coating, 152-heat dissipation sheet, 153-aluminum extrusion, 1531-back ridge, 1532-fin, 16-optical film;

20-liquid crystal module.

DETAILED DESCRIPTION

The following will describe technical solutions of implementations of the disclosure with reference to the drawings. Obviously, implementations described herein are merely some implementations, rather than all implementations, of the disclosure. Based on the implementations described in the disclosure, all other implementations obtained by those of ordinary skill in the art without creative effort shall fall within the protection scope of the disclosure.

Figure 1:
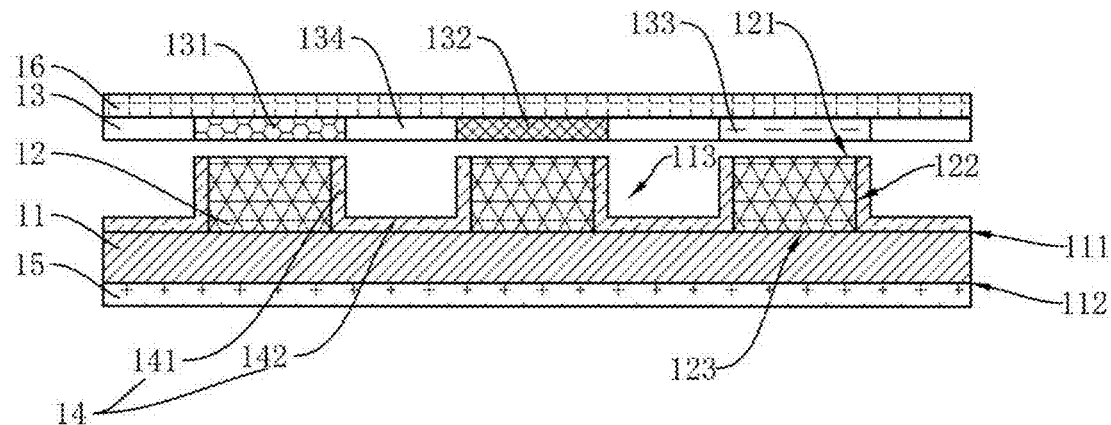
FIG. 1 is a first schematic structural diagram of a backlight module according to embodiments.

Referring to FIG. 1, embodiments of the disclosure provide a backlight module 10.

The backlight module 10 includes a substrate 11, multiple light emitting diodes 12, a quantum dot layer 13, a light-shielding layer 14, a heat dissipation structure 15, and an optical film 16.

The substrate 11 has a first surface 111 and a second surface 112 opposite to the first surface 111. The multiple light emitting diodes 12 are disposed on the first surface 111.

The quantum dot layer 13 is disposed on one side of the multiple light emitting diodes 12 facing away from the substrate 11.

The multiple light emitting diodes 12 are each configured to emit lights of a first color. The lights of the first color are of the first color, a second color, or a third color after passing through the quantum dot layer 13. A mixture of the first color, the second color, and the third color is white.

The light-shielding layer 14 is disposed between each two adjacent light emitting diodes 12. The light-shielding layer 14 is used to block stray lights between each two adjacent light emitting diodes 12 to alleviate the problem of optical crosstalk.

The heat dissipation structure 15 is disposed on the second surface 112 to absorb the heat transferred by the substrate 11 and dissipate the heat into air around the heat dissipation structure 15.

Specifically, the substrate 11 can be made of phenolic resin, epoxy resin, polyimide, glass, and the like.

The light emitting diodes 12 may be conventional Light Emitting Diodes (LED), mini LEDs (LEDs with a size between 50 μm and 200 μm), or micro LEDs (LEDs with a size smaller than 50 μm). The multiple light emitting diodes 12 are arranged in an array on the first surface 111 of the substrate 11. The multiple light emitting diodes 12 emit lights of the first color when the multiple light emitting diodes are on.

The quantum dot layer 13 can be a flexible film, a hard glass plate, or the like. The quantum dot layer 13 includes a first color conversion area 131, a second color conversion area 132, and a third color conversion area 133. The second color conversion area 132 may be provided with red quantum dots or quantum dots of other colors. The third color conversion area 133 may be provided with green quantum dots or quantum dots of other colors. Lights of the first color are converted into lights of the second color after passing through the second color conversion area 132. Lights of the first color are converted into lights of the third color after passing through the third color conversion area 133.

Figure 9:
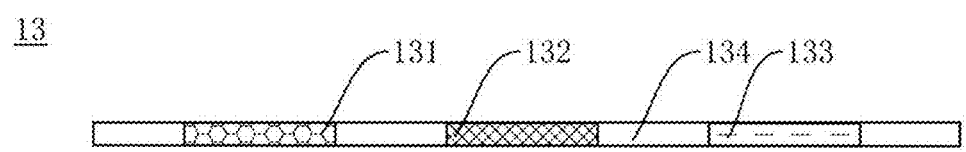
FIG. 9 is a first schematic structural diagram of a quantum dot layer according to embodiments.

Specifically, referring to FIG. 9, a connection area 134 may be between the first color conversion area 131 and the second color conversion area 132, or between the second color conversion area 132 and the third color conversion area 133. The connection area 134 can be made of a reflective material. When the connection area 134 is made of a reflective material, after lights of the first color emitted from the light emitting diodes 12 reach the connection area 134, the lights emitted from the light emitting diodes 12 can be reflected by the connection area 134, so that the lights are unable to pass through the quantum dot layer 13.

In this way, the lights of the first color can only pass through the quantum dot layer 13 via the first color conversion area 131 and/or the second color conversion area 132 and/or the third color conversion area 133 and can be converted into corresponding lights of the second color and/or the third color, which can avoid a phenomenon that the lights of the first color pass through the connection area 134 and mix with lights of other colors to cause variegated or mixed colors.

The connection area 134 may also be made of a light-transparent material. Specifically, when a large brightness of lights of the first color is required in a local area, the connection area 134 can be made of a light-transparent material, and the lights of the first color emitted from the light emitting diodes 12 can pass through the connection area 134, which can avoid that the lights of the first color are blocked by the connection area 134 and the transmittance of the lights is reduced.

Figure 10:
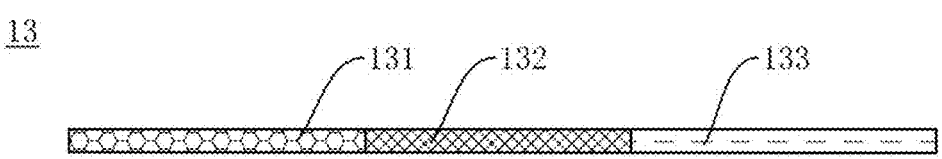
FIG. 10 is a second schematic structural diagram of a quantum dot layer according to embodiments.

In other embodiments, referring to FIG. 10, the first color conversion area 131 and the second color conversion area 132 may also be connected, and the connection of the first color conversion area 131 and the second color conversion area 132 may be between two adjacent light emitting diodes 12, to avoid that only part of the lights of the first color can pass through the conversion area, so that the brightness of lights of the second color or the third color is too low and the color is not pure. The lights of the first color may be any of blue lights, green lights, red lights, and the like. Further, when the second color conversion area 132 is provided with red quantum dots, the lights of the second color are red, and when the third color conversion area 133 is provided with green quantum dots, the lights of the third color are green.

The backlight module 10 further includes multiple pixel units, and each pixel unit includes multiple sub-pixels. The pixel unit includes at least three light emitting diodes 12, and a first color conversion area 131, a second color conversion area 132, or a third color conversion area 133 corresponding to each light emitting diode 12. Each pixel unit can emit lights of white or other full-color mixed from lights of the first color, the second color, and the third color.

Specifically, there may be three light emitting diodes 12 in a pixel unit, and the three light emitting diodes 12 have the same size. The light emitting diodes 12 can be arranged side by side in a straight line, or arranged in a broken line, or the light emitting diodes 12 can also be arranged in a triangle in which the three light emitting diodes 12 are respectively located on the three sides or three corners of the triangle, which is not limited herein.

In other embodiments, there may be more than three light emitting diodes 12 in a pixel unit, and lights emitted by at least two of the light emitting diodes 12 are of the same color after passing through the quantum dot layer 13.

In other embodiments, the light emitting diodes 12 can also have different sizes, to reduce the area occupied by a single pixel unit, and more pixel units can be designed in the backlight module 10 with the same area to achieve higher visual brightness.

After the multiple light emitting diodes 12 are on, part of lights of the first color emitted by the light emitting diodes 12 may be absorbed by the light-shielding layer 14, and at the same time, the light-shielding layer 14 may also absorb the heat emitted by the light emitting diodes 12 and conduct the heat to the heat dissipation structure 15 via the substrate 11, for the heat dissipation structure 15 to conduct the heat out of the backlight module 10.

In other embodiments, the heat dissipation structure 15 may be disposed on a part of the second surface 112, for example, where the light emitting diodes 12 need to be on for a long time or the light emitting diodes 12 are densely arranged, or where the light-shielding layer 14 is dense or thicker. In this way, the heat dissipation of the part of the backlight module 10 where the heat is more serious can be enhanced, and the thickness of the part with less heat in the backlight module 10 is not affected, to reduce the local thickness of the liquid crystal display panel 100, and other components can be added to the thinner part of the liquid crystal display panel 100.

The optical film 16 is disposed on one side of the quantum dot layer 13 facing away from the light emitting diodes 12, to improve the brightness of lights passing through. The optical film 16 may include one or more of a diffuser plate, a light guide plate, a brightness enhancement film, a composite brightness enhancement film, a diffuser sheet, and the like. The optical film 16 is made of, including but not limited to, cellulose triacetate, polyvinyl alcohol, acrylic resin, and the like.

In the disclosure, the heat dissipation structure 15 is disposed on the second surface 112 of the substrate 11 facing away from the light emitting diodes, and the heat dissipation structure 15 can be used to dissipate the heat generated in the backlight module 10 into air around the heat dissipation structure 15. After the multiple light emitting diodes 12 are on, part of the lights emitted by the light emitting diodes 12 will be blocked by the light-shielding layer 14, and the heat generated with the lights will also be absorbed by the light-shielding layer 14. The heat absorbed by the light-shielding layer 14 and the heat generated by the light emitting diodes 12 will be conducted to the substrate 11 and dissipated together with the heat generated by the substrate 11 via the heat dissipation structure 15 into air around the heat dissipation structure 15, thereby avoiding the problem that the luminous efficiency of the light emitting diodes 12 is reduced due to the overheating of the backlight module 10.

In embodiments, referring to FIG. 1, the multiple light emitting diodes 12 each have a side surface 122. The side surface 122 and the first surface 111 define an angle. The light-shielding layer 14 includes a first light-shielding layer 141. The first light-shielding layer 141 covers the side surface 122.

Specifically, the light emitting diode 12 has a light emitting surface 121, a mounting surface 123 opposite to the light emitting surface 121, and a side surface 122 connected between the light emitting surface 121 and the mounting surface 123. The mounting surface 123 faces the first surface 111. The light emitting surface 121 is used to transmit lights. The angle between the side surface 122 and the first surface 111 may be any angle between 0° and 90°. Preferably, in this embodiment, the angle between the side surface 122 and the first surface 111 is 90°.

When lights emitted by the light emitting diodes 12 are emitted through the light emitting surface 121, part of lights may be emitted through the side surface 122. Lights of the first color emitted from the light emitting surface 121 may pass through the second color conversion area 132 or the third color conversion area 133 to be converted into lights of the second color or the third color, and lights of the first color emitted from the side surface 122 may reach other positions of the quantum dot layer 13, which affects the overall light output effect and results in optical crosstalk.

For example, taking two light emitting diodes 12 corresponding to the first color conversion area 131 and the second color conversion area 132 as an example, when the light emitting diode 12 of the first color conversion area 131 is on and the light emitting diode 12 of the second color conversion area 132 is off, lights of the first color emitted from the side surface 122 of the light emitting diode 12 which is on will enter the second color conversion area 132, so that the lights of the first color are converted into lights of the second color, which results in the overall lights to appear impure color.

Further, in embodiments, the shape of the light emitting diode 12 may be a cube, and the side surface 122 of the light emitting diode 12 includes a first side surface, a second side surface, a third side surface, and a fourth side surface. The first light-shielding layer 141 may cover one or more of the first side surface, the second side surface, the third side surface, and the fourth side surface.

Figure 11:
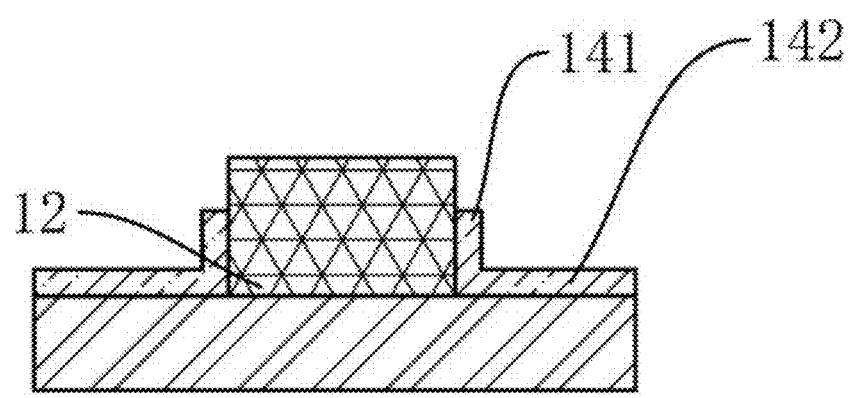
FIG. 11 is a first schematic structural diagram of a first light-shielding layer according to embodiments.
Figure 12:
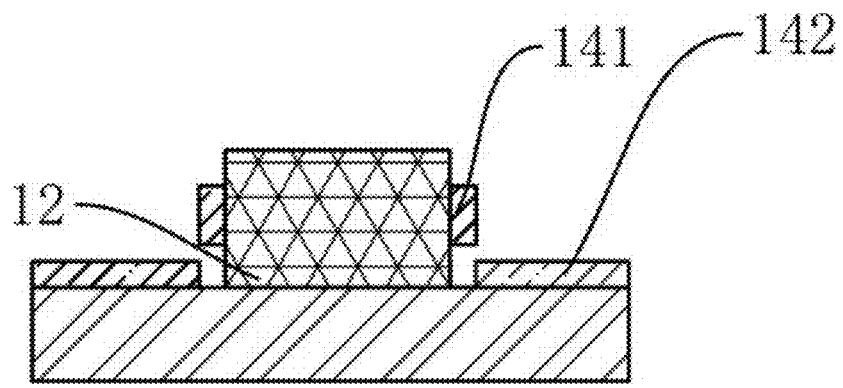
FIG. 12 is a second schematic structural diagram of a first light-shielding layer according to embodiments.
Figure 13:
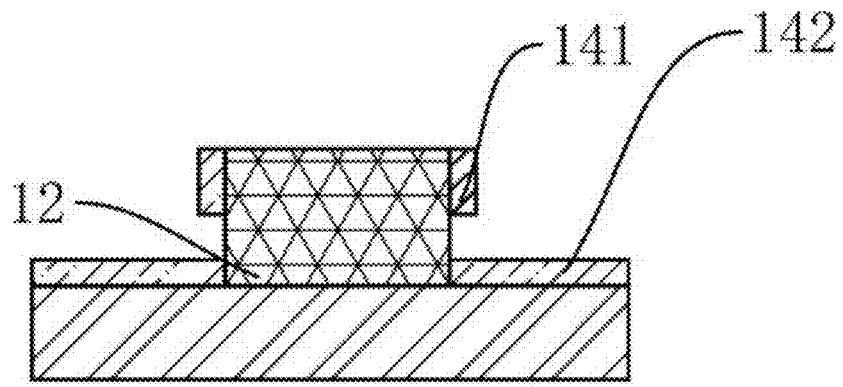
FIG. 13 is a third schematic structural diagram of a first light-shielding layer according to embodiments.

In other embodiments, referring to FIGS. 11 to 13, the first light-shielding layer 141 may be disposed in a local area of the side surface 122, for example, in the middle of the side surface 122, in a position of the side surface 122 close to or away from the first surface 111, or the like. When the first light-shielding layer 141 is in a position of the side surface 122 away from the first surface 111, the first light-shielding layer 141 can shield lights emitted from a position of the side surface 122 of the light emitting diode 12 away from the first surface 111. When the first light-shielding layer 141 is in a position of the side surface 122 close to the first surface 111, the first light-shielding layer 141 can shield lights emitted from the position of the side surface 122 of the light emitting diode 12 close to the first surface 111. When the first light-shielding layer 141 is in the middle of the side surface 122, the first light-shielding layer 141 can shield lights emitted from the middle of the side surface 122 of the light emitting diode 12. By disposing the light-shielding layer 14 in a local area of the side surface 122, lights emitted from the side surface 122 of the light emitting diode 12 can be accurately shielded to save cost.

In other embodiments, in a same backlight module 10, light emitting diodes 12 disposed in some local areas have higher luminous brightness than other areas, and optical crosstalk in these local areas is more obvious than other areas. Therefore, the first light-shielding layer 141 can be disposed in these local areas with higher luminous brightness and can be omitted in other areas to save cost.

In other embodiments, in a same backlight module 10, the distance between two adjacent light emitting diodes 12 disposed in some local areas is smaller than other areas, and optical crosstalk in these local areas is more obvious than other areas. Then, the first light-shielding layer 141 can be only disposed in these local areas with a smaller distance to save cost.

Further, the first light-shielding layer 141 can be made of an opaque paint, and the opaque paint can contain, including but not limited to, a polymer material, a reflective material, a light-absorbing material, a hydrophobic material, a carbon material, a dispersant, an active agent, and the like. The polymer material may be a material with curing properties, including but not limited to epoxy resin, Polymethyl Methacrylate (PMMA), silicone rubber, and the like. The hydrophobic material may be polytetrafluoroethylene, polycarbonate, polyacrylonitrile, and the like. A hydrophobic material is contained in the first light-shielding layer 141 to achieve waterproof function and improve water and oxygen barrier properties of the backlight module 10.

The first light-shielding layer 141 may be black or other colors, which is not limited herein. The first light-shielding layer 141 can be made through coating, inkjet printing, physical/chemical vapor deposition, or other procedures.

In other embodiments, the first light-shielding layer 141 may also be an opaque adhesive layer. The first light-shielding layer 141 can be formed through coating and curing procedures.

In other embodiments, the first light-shielding layer 141 may further contain reflective particles. The material of the reflective particles includes inorganic non-metals and/or metals. The size of the reflective particles is not specifically limited herein. The reflective particles reflect lights of the first color emitted from the side surface 122 after the light emitting diode 12 is on. The lights of the first color return to the light emitting diode 12 after being reflected by the reflective particles, and can be emitted from the light emitting surface 121, thereby enhancing the intensity of the lights of the first color emitted from the light emitting surface 121 and improving the brightness.

The reflective particles can be mixed as constituent raw material with other raw materials during preparation of the first light-shielding layer 141, to omit the preparation of recombination of the reflective particles and the first light-shielding layer 141.

The reflective particles can also cover the surface of the first light-shielding layer 141, and after the first light-shielding layer 141 is connected to the side surface 122, the reflective particles are between the first light-shielding layer 141 and the side surface 122, to enhance the uniformity of the reflective particles in the first light-shielding layer 141 and improve the reflection efficiency of the lights of the first color by the reflective particles.

The first light-shielding layer 141 covers the side surface 122 to block or reflect the lights of the first color on the side surface 122, which can avoid optical crosstalk.

In embodiments, referring to FIG. 1, the light-shielding layer 14 further includes a second light-shielding layer 142, the second light-shielding layer 142 is disposed on the first surface 111, and the second light-shielding layer 142 connects the first light-shielding layer 141 located on the side surfaces 122 of each two adjacent light emitting diodes 12.

Specifically, any two adjacent light emitting diodes 12 define a gap 113, and the second light-shielding layer 142 can be disposed in the gap 113. The composition material of the second light-shielding layer 142 may be the same as or different from the composition material of the first light-shielding layer 141.

In other embodiments, the second light-shielding layer 142 may also be disposed on a part of the first surface 111 to protect local corrosion-prone circuits on the substrate 11.

The thickness of the second light-shielding layer 142 may be the same as or different from the thickness of the first light-shielding layer 141. Specifically, the thickness of the first light-shielding layer 141 is the thickness in the direction perpendicular to the side surface 122, and the thickness of the second light-shielding layer 142 is the thickness in the direction perpendicular to the first surface 111.

In other embodiments, when the thickness of the second light-shielding layer 142 is different from the thickness of the first light-shielding layer 141, the thickness of the second light-shielding layer 142 may be not less than the thickness of the light emitting diode 12.

The second light-shielding layer 142 can be made through coating, inkjet printing, physical/chemical vapor deposition, or other procedures. The second light-shielding layer 142 is disposed on the first surface 111, which can avoid that the substrate 11 is corroded by water and oxygen and thus the circuit structure on the substrate 11 is affected and problems such as short circuit occur.

Figure 2:
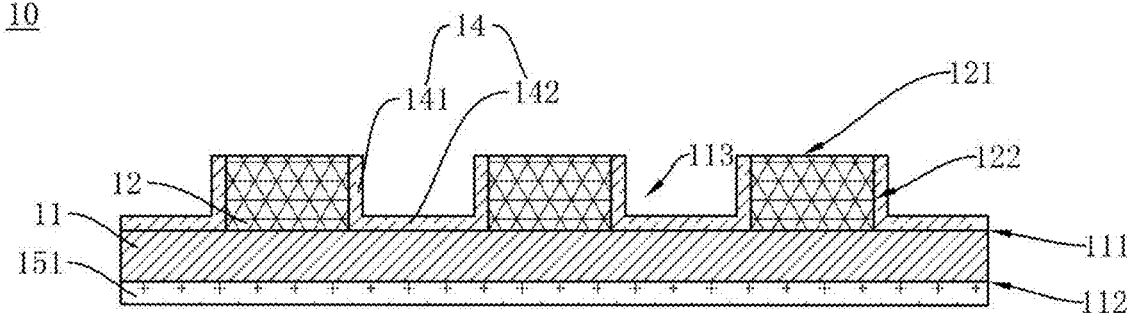
FIG. 2 is a second schematic structural diagram of a backlight module according to embodiments.

In embodiments, referring to FIG. 2, the heat dissipation structure 15 is a thermal conductive coating 151. Specifically, a binder or a curing agent may be added to the thermal conductive coating 151 to increase the bonding strength between the thermal conductive coating 151 and the second surface 112 or to make the thermal conductive coating 151 easy to be cured on the second surface 112. A dispersant, an active agent, or the like may also be added to the thermal conductive coating 151 to improve the uniformity of the thermal conductive coating 151.

The thermal conductive coating 151 can be made through coating, inkjet printing, physical/chemical vapor deposition, or other procedures.

In other embodiments, a thermal conductive adhesive may be pre-disposed between the thermal conductive coating 151 and the second surface 112, and then the thermal conductive coating 151 is made through coating for example. The bonding strength between the thermal conductive coating 151 and the second surface 112 is enhanced by the thermal conductive adhesive, so that the thermal conductive coating 151 is not easy to fall off after being heated. The thermal conductive adhesive includes but is not limited to an acrylate adhesive, an epoxy resin adhesive, an organic silica gel, a polyurethane adhesive, a composite adhesive, and the like.

In other embodiments, holes may also be defined on the thermal conductive coating 151, so that a part of the second surface 112 is in contact with the air, thereby increasing the heat dissipation area of the thermal conductive coating 151 and thus enhancing the heat dissipation of the thermal conductive coating 151. The holes can be formed by using a coating template with holes, and are integrally formed when the thermal conductive coating 151 is provided, or through cutting or etching procedures after the thermal conductive coating 151 is cured. The shape of the holes may be a circle or a polygon, which is not specifically limited herein.

The heat dissipation structure 15 is designed as the thermal conductive coating 151, which helps to manufacture the thermal conductive coating 151 on the substrate 11 in industrial production and save costs, and the structure of the thermal conductive coating 151 can be designed to enhance the heat dissipation.

In an implementation, referring to FIG. 2, the thermal conductive coating 151 is made of one or more of aluminum oxide, beryllium oxide, aluminum nitride, and boron nitride.

Specifically, the thermal conductive coating 151 may be a single-layer thermal conductive ceramic material. The thermal conductive ceramic material may be a slurry containing only alumina particles, or a mixed slurry containing alumina and aluminum nitride, and can be disposed on the second surface 112 through coating for example. It can be understood that, the slurry of the thermal conductive ceramic material can be a mixture of one or more materials.

Figure 3:
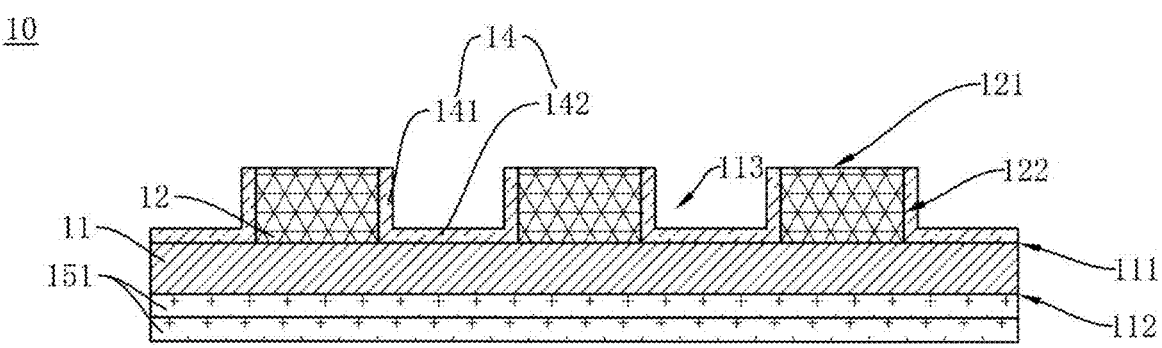
FIG. 3 is a third schematic structural diagram of a backlight module according to embodiments.

In other embodiments, referring to FIG. 3, the thermal conductive coating 151 may be provided by stacking multiple layers of thermal conductive ceramic materials, to avoid nonuniform preparation of a single-layer thermal conductive coating 151. Specifically, the thermal conductive coating 151 may include an aluminum oxide coating connected to the second surface 112, and may also include a beryllium oxide coating connected to the aluminum oxide coating. It can be understood that, a layer of the thermal conductive coating 151 may be a coating only containing one thermal conductive ceramic material, or a mixed coating containing multiple thermal conductive ceramic materials.

The multiple layers of thermal conductive coatings 151 can be arranged according to different thermal conductivities of different thermal conductive ceramic materials in descending or ascending order of the thermal conductivities, to enhance the conduction of heat in the heat dissipation structure 15.

In other embodiments, the thermal conductive coating 151 can be made of a graphite sheet, graphene, graphene oxide, silica gel, a glass fiber, and the like.

By making the thermal conductive coating 151 with different materials, more efficient thermal conductive coatings 151 can be provided for backlight modules 10 of different sizes or different calorific values.

Figure 4:
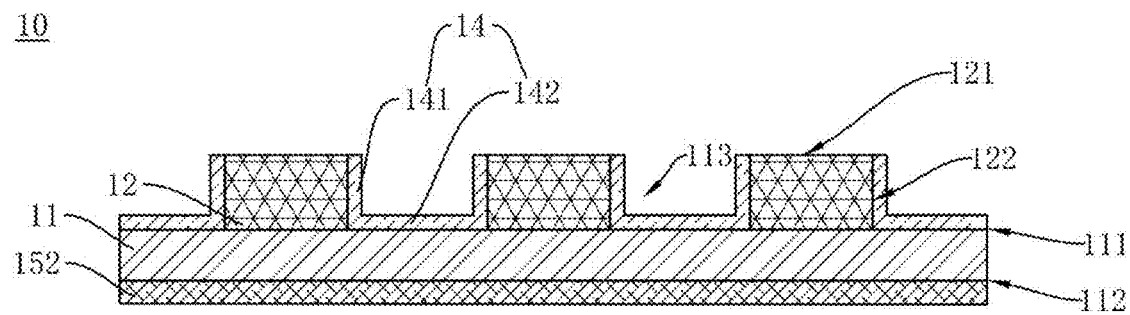
FIG. 4 is a fourth schematic structural diagram of a backlight module according to embodiments.

In embodiments, referring to FIG. 4, the substrate 11 is made of glass, the heat dissipation structure 15 is a heat dissipation sheet 152, and the heat dissipation sheet 152 is bonded to the substrate 11. When a substrate 11 made of glass is used for the backlight module 10, the heat dissipation structure 15 may be a metal or non-metal sheet.

Specifically, the heat dissipation sheet 152 and the substrate 11 may be connected by a thermal conductive adhesive. The heat dissipation sheet 152 can be made of metal, including but not limited to aluminum foil, silver foil, gold foil, and the like, or may also be made of non-metal, including but not limited to a ceramic sheet, a glass fiber sheet, and the like.

Figure 5:
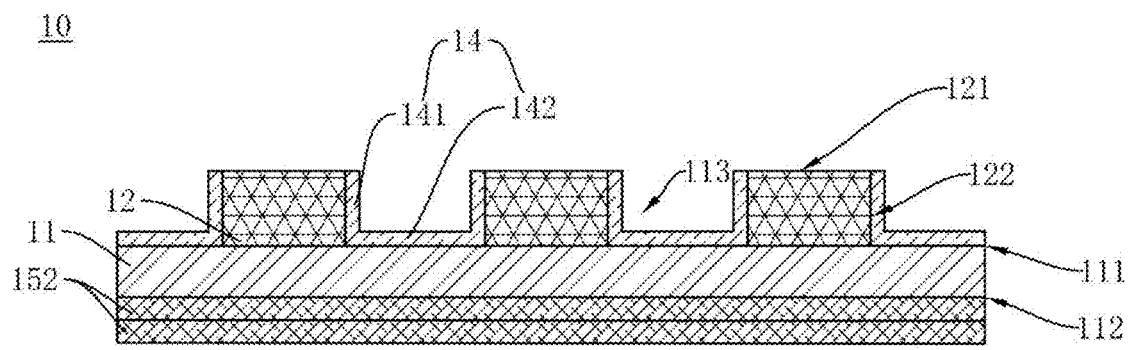
FIG. 5 is a fifth schematic structural diagram of a backlight module according to embodiments.

Further, referring to FIG. 5, the heat dissipation sheet 152 may include a single layer or multiple layers. When the heat dissipation sheet 152 include multiple layers, the heat dissipation sheet 152 can be provided by stacking sheets of different materials.

In other embodiments, the heat dissipation sheet 152 may define multiple heat dissipation holes (not shown), and the shape of the heat dissipation holes may be circular or polygonal, to increase the surface area of the heat dissipation sheet 152 and improve the heat dissipation performance of the heat dissipation sheet 152.

By providing the heat dissipation structure 15 as the heat dissipation sheet 152 for the glass substrate 11 made of glass, the heat dissipation effect can be enhanced, and short circuit caused by a metal sheet or a conductive sheet on other substrates 11 can be avoided.

Figure 6:
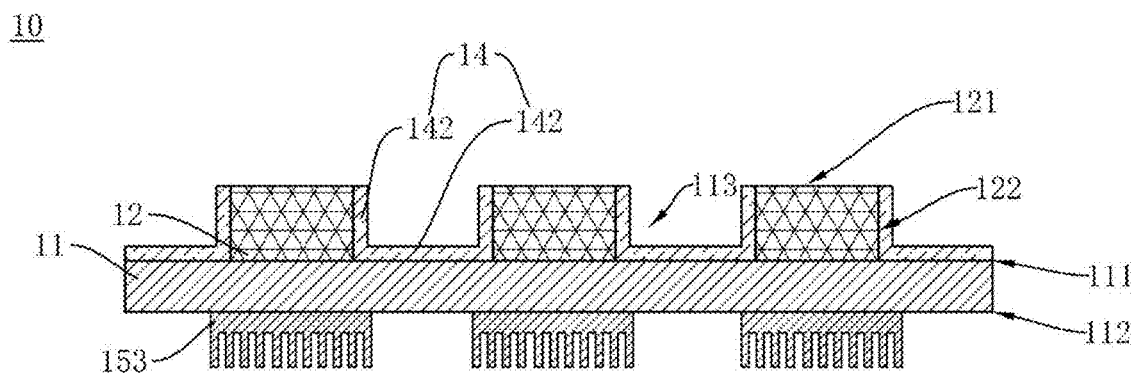
FIG. 6 is a sixth schematic structural diagram of a backlight module according to embodiments.
Figure 8:
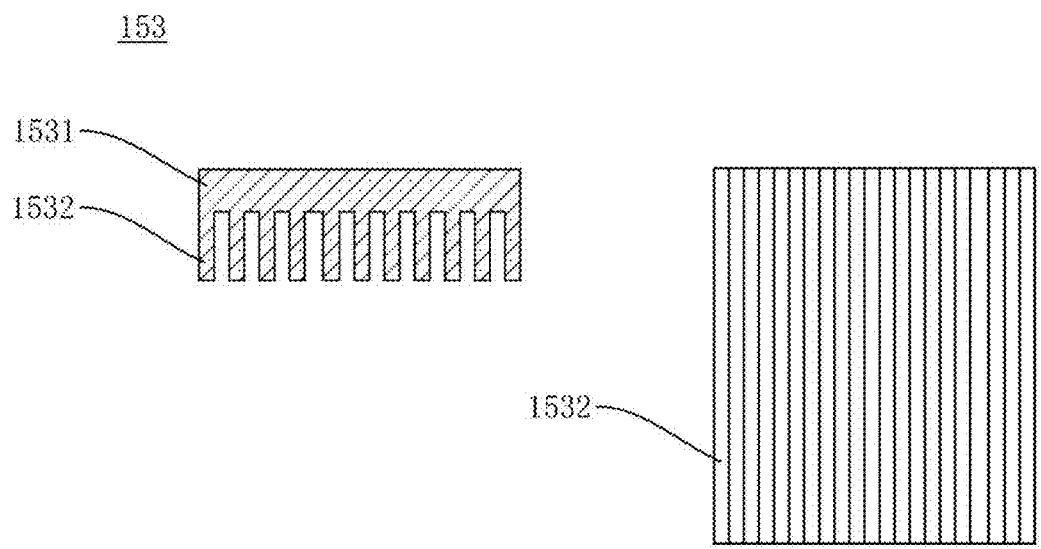
FIG. 8 is a schematic structural diagram of an aluminum extrusion according to embodiments.

In embodiments, referring to FIGS. 6 and 8, the substrate 11 is a printed circuit board, and the heat dissipation structure 15 is an aluminum extrusion 153. Specifically, the aluminum extrusion 153 may be disposed on the second surface 112 by Surface Mount Technology (SMT). The aluminum extrusion 153 includes a back ridge 1531 and multiple fins 1532. The multiple fins 1532 can be arranged in parallel at equal intervals. The multiple fins 1532 each have one end connected to the surface of the back ridge 1531. One end of the back ridge 1531 facing away from the fins 1532 is connected to the second surface 112.

In other embodiments, the multiple fins 1532 may also be arranged in a non-parallel manner, and ends of any two adjacent fins 1532 may be connected (not shown). In this way, the stability inside the aluminum extrusion 153 can be increased, so that the fins 1532 are not easy to break or damage.

In other embodiments, the shape of the fins 1532 may also be helical, to increase the surface area of the fins 1532 and the space inside the aluminum extrusion 153 for the air to flow, thereby increasing the contact area of the aluminum extrusion 153 with the air.

By designing the heat dissipation structure 15 as the aluminum extrusion 153, the effect of large-area heat dissipation can be achieved, and the heat conducted from the substrate 11 to the aluminum extrusion 153 can be dissipated more quickly, thereby enhancing the heat dissipation.

In embodiments, referring to FIG. 6, the aluminum extrusion 153 is multiple aluminum extrusions 153, and the multiple aluminum extrusions 153 are arranged at intervals. Specifically, the multiple aluminum extrusions 153 can be extruded on the second surface 112 one by one by SMT, or can be provided by cutting a complete piece of aluminum extrusion 153 into multiple aluminum extrusions 153, where adjacent aluminum extrusions 153 are spaced apart.

The number of the aluminum extrusions 153 can be consistent with the number of the light emitting diodes 12, and the positions of the aluminum extrusions 153 can correspond to the positions of the light emitting diodes 12, so that the heat generated by each light emitting diode 12 can be quickly conducted to a corresponding aluminum extrusion 153, which improves the heat dissipation efficiency of the aluminum extrusions 153 for the light emitting diodes 12.

In other embodiments, the positions of the aluminum extrusions 153 can also correspond to the positions of the gaps 113, so that the heat absorbed by the light-shielding layer 14 on the gaps 113 can be quickly conducted to a corresponding aluminum extrusion 153, which improves the heat dissipation efficiency of the aluminum extrusions 153 for the light-shielding layer 14.

By providing multiple aluminum extrusions 153, the heat dissipation effect of the backlight module 10 can be maintained and the weight of the backlight module 10 can be reduced, thereby achieving a lightweight design of the liquid crystal display panel 100.

Figure 7:
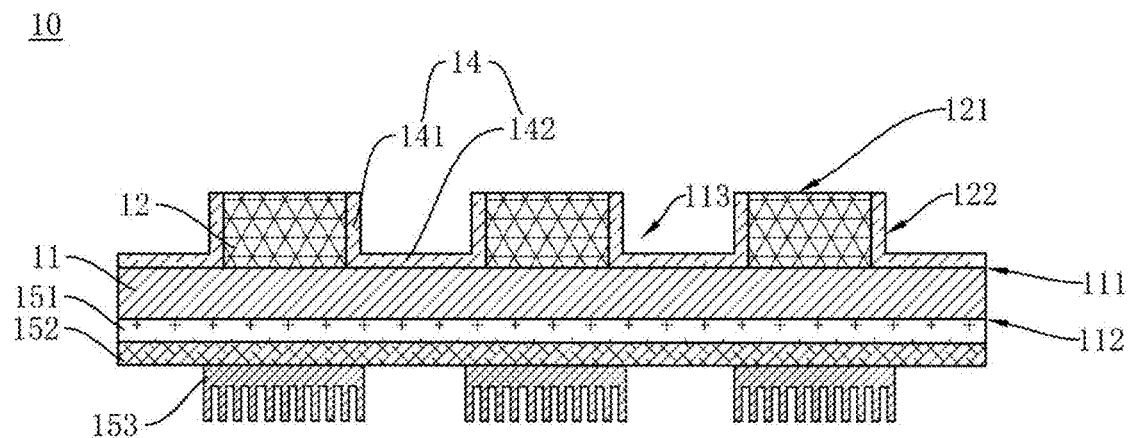
FIG. 7 is a seventh schematic structural diagram of a backlight module according to embodiments.

In embodiments, referring to FIG. 7, the heat dissipation structure 15 is multiple heat dissipation structures 15, and the multiple heat dissipation structures 15 are stacked. The multiple heat dissipation structures 15 may include a thermal conductive coating 151 and a heat dissipation foil or aluminum extrusion 153, and can be stacked according to the manufacturing procedure.

Specifically, the preparation method may be as follow. A thermal conductive coating 151 is prepared on the second surface 112 by a vapor deposition technique and serves as the first layer of the heat dissipation structure 15. A heat dissipation sheet 152 is then adhered on the thermal conductive coating 151 by a thermal conductive adhesive and serves as the second layer of the heat dissipation structure 15. An aluminum extrusion 153 or a thermal conductive coating 151 may further be provided as the third layer of the heat dissipation structure 15.

In other embodiments, the preparation method of the multiple heat dissipation structures 15 may also be as follows. Multiple layers of thermal conductive coatings 151 or heat dissipation sheets 152 are prepared. A layer of aluminum extrusion 153 is then prepared on the surface of the thermal conductive coatings 151 or the heat dissipation sheets 152 by SMT.

In other embodiments, the preparation method may also be as follows. An aluminum extrusion 153 is connected to the substrate 11 via the thermal conductive coating 151. A viscous material such as a thermal conductive adhesive is added to the thermal conductive coating 151 to increase the adhesive force of the thermal conductive coating 151. A layer of thermal conductive coating 151 is laid on the second surface 112 through vapor deposition or other procedures. The aluminum extrusion 153 is disposed on the thermal conductive coating 151 when the coating is still viscous. In this way, the heat dissipation structure 15 can be provided and the manufacturing procedure can also be simplified to save costs.

Figure 14:
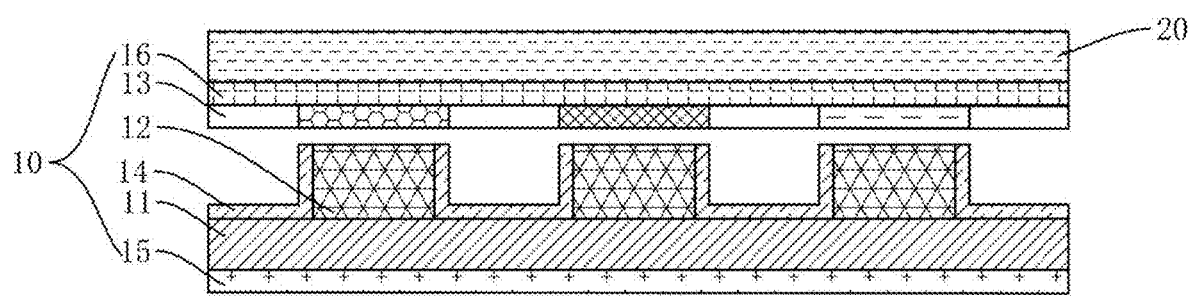
FIG. 14 is a schematic structural diagram of a liquid crystal display panel according to embodiments.

Referring to FIG. 14, embodiments of the disclosure provide a liquid crystal display panel 100. The liquid crystal display panel includes the backlight module 10 provided in any implementation in embodiments above and a liquid crystal module 20. The liquid crystal module 20 and the backlight module 10 are stacked. The backlight module 10 is configured to emit lights to the liquid crystal module 20.

The liquid crystal module 20 is on one side of the optical film 16 facing away from the quantum dot layer 13. The liquid crystal module 20 includes a first polarizer, an array substrate 11, a liquid crystal, a color film substrate 11, a second polarizer, and the like, where the first polarizer, the array substrate 11, the liquid crystal, the color film substrate 11, the second polarizer are stacked, which is not specifically limited herein and can refer to the existing structure.

By stacking the liquid crystal module 20 on the backlight module 10 in the liquid crystal display panel 100, lights emitted by the backlight module 10 can be more uniform after passing through the liquid crystal module 20, and the brightness of the lights passing through is improved, thereby improving the viewing experience of the user.

In the description of embodiments, it should be noted that, the orientation or positional relationship indicated by terms "center", "upper", "lower", "left", "right", "vertical", "horizontal", "inner", "outer", and the like is based on the orientation or positional relationship illustrated in drawings, which is only for the convenience of describing the disclosure and simplifying the description, rather than indicating or implying that the device or element referred to must have a specific orientation or be constructed and operated in a specific orientation, and is therefore not to be construed as a limitation of the disclosure.

The above disclosure only illustrates preferred embodiments of the disclosure, and cannot limit the scope of the disclosure. Those of ordinary skill in the art can understand that, equivalent changes that realize some or all of the processes of above-mentioned embodiments and are made according to the claims of the disclosure still fall within the scope of the disclosure.

What is claimed is:

1. A backlight module, comprising:
   a substrate having a first surface and a second surface opposite to the first surface;
   a plurality of light emitting diodes disposed on the first surface;
   a quantum dot layer disposed on one side of the plurality of light emitting diodes facing away from the substrate;
   a light-shielding layer disposed between each two adjacent light emitting diodes; and
   a heat dissipation structure disposed on the second surface, wherein the plurality of light emitting diodes are each configured to emit lights of a first color, the lights of the first color are of the first color, a second color, or a third color after passing through the quantum dot layer, and a mixture of the first color, the second color, and the third color is white, each of the plurality of light emitting diode has a side surface, the light-shielding layer comprises a first light-shielding layer and a second light-shielding layer, the first light-shielding layer covers the side surface, the second light-shielding layer is disposed on the first surface, the second light-shielding layer connects the first light-shielding layer of each two adjacent light emitting diodes, and a height of the second light-shielding layer protruding from the substrate is less than a height of the light emitting diode protruding from the substrate.

2. The backlight module of claim 1, wherein the heat dissipation structure is a thermal conductive coating.

3. The backlight module of claim 2, wherein the thermal conductive coating is made of one or more of aluminum oxide, beryllium oxide, aluminum nitride, and boron nitride.

4. The backlight module of claim 1, wherein the substrate is made of glass, the heat dissipation structure is a heat dissipation sheet, and the heat dissipation sheet is bonded to the substrate.

5. The backlight module of claim 1, wherein the substrate is a printed circuit board, and the heat dissipation structure is an aluminum extrusion.

6. The backlight module of claim 5, wherein the aluminum extrusion is a plurality of aluminum extrusions, and the plurality of aluminum extrusions are arranged at intervals.

7. The backlight module of claim 1, wherein the heat dissipation structure is a plurality of heat dissipation structures, and the plurality of heat dissipation structures are stacked.

8. The backlight module of claim 1, wherein the side surface and the first surface define an angle.

9. The backlight module of claim 1, further comprising an optical film disposed on one side of the quantum dot layer facing away from the plurality of light emitting diodes.

10. A liquid crystal display panel, comprising:
    a liquid crystal module; and
    a backlight module comprising:
      a substrate having a first surface and a second surface opposite to the first surface;
      a plurality of light emitting diodes disposed on the first surface;
      a quantum dot layer disposed on one side of the plurality of light emitting diodes facing away from the substrate;
      a light-shielding layer disposed between each two adjacent light emitting diodes; and
      a heat dissipation structure disposed on the second surface, wherein the plurality of light emitting diodes are each configured to emit lights of a first color, the lights of the first color are of the first color, a second color, or a third color after passing through the quantum dot layer, and a mixture of the first color, the second color, and the third color is white, each of the plurality of light emitting diode has a side surface, the light-shielding layer comprises a first light-shielding layer and a second light-shielding layer, the first light-shielding layer covers the side surface, the second light-shielding layer is disposed on the first surface, the second light-shielding layer connects the first light-shielding layer of each two adjacent light emitting diodes, and a height of the second light-shielding layer protruding from the substrate is less than a height of the light emitting diode protruding from the substrate, wherein
    the liquid crystal module and the backlight module are stacked, and the backlight module is configured to emit lights to the liquid crystal module.

11. The liquid crystal display panel of claim 10, wherein the heat dissipation structure is a thermal conductive coating.

12. The liquid crystal display panel of claim 11, wherein the thermal conductive coating is made of one or more of aluminum oxide, beryllium oxide, aluminum nitride, and boron nitride.

13. The liquid crystal display panel of claim 10, wherein the substrate is made of glass, the heat dissipation structure is a heat dissipation sheet, and the heat dissipation sheet is bonded to the substrate.

14. The liquid crystal display panel of claim 10, wherein the substrate is a printed circuit board, and the heat dissipation structure is an aluminum extrusion.

15. The liquid crystal display panel of claim 14, wherein the aluminum extrusion is a plurality of aluminum extrusions, and the plurality of aluminum extrusions are arranged at intervals.

16. The liquid crystal display panel of claim 10, wherein the heat dissipation structure is a plurality of heat dissipation structures, and the plurality of heat dissipation structures are stacked.

17. The liquid crystal display panel of claim 10, wherein the side surface and the first surface define an angle.

18. The liquid crystal display panel of claim 10, further comprising an optical film disposed on one side of the quantum dot layer facing away from the plurality of light emitting diodes.

\* \* \* \* \*